(Model.)

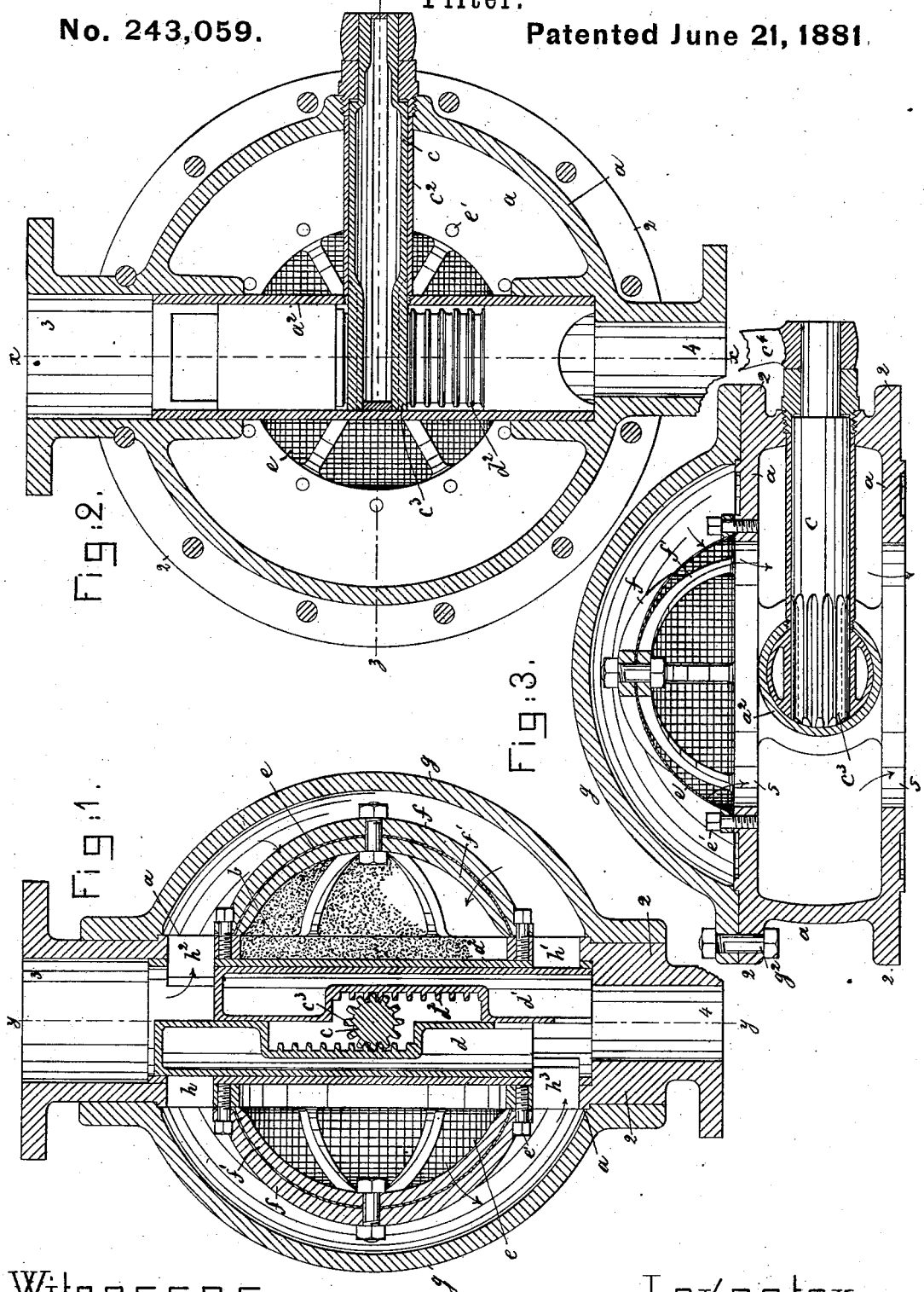

C. CARR.
Filter.

No. 243,059. Patented June 21, 1881.

2 Sheets—Sheet 2.

Witnesses.
Arthur Reynolds.
W. H. Sigston.

Inventor.
Chas. Carr,
by Crosby & Gregory Attys.

UNITED STATES PATENT OFFICE.

CHARLES CARR, OF BOSTON, MASSACHUSETTS.

FILTER.

SPECIFICATION forming part of Letters Patent No. 243,059, dated June 21, 1881.

Application filed April 19, 1881. (Model.)

*To all whom it may concern:*

Be it known that I, CHARLES CARR, of Boston, county of Suffolk, and State of Massachusetts, have invented a new and useful Improvement in Filters of which the following description, in connection with the accompanying drawings, is a specification.

This invention relates to filters for water and other fluids, and has for its object a novel and simple construction thereof, as will be hereinafter described.

My invention in filters consists in a filter having a case provided with a valve composed of two oppositely-movable parts adapted to cause the water or other fluid to enter and pass through the filtering medium in the case from either side thereof, in order that the sediment deposited at one side of the case by the passage or flow of water for any considerable length of time in one direction may be removed therefrom. The valve is also so constructed that in other positions of its parts the water may pass into and from the external shell of the filter without passing through the filtering-case.

My herein-described valve is composed of two parts connected in suitable manner with a partially-rotating shaft, so that movement of the said shaft in one or the other direction will operate the two parts of the valve in opposite directions, to thus determine into and from which side of the filter-case the water shall pass and flow, or to permit the water to flow freely about the case, if desired.

Figure 4:
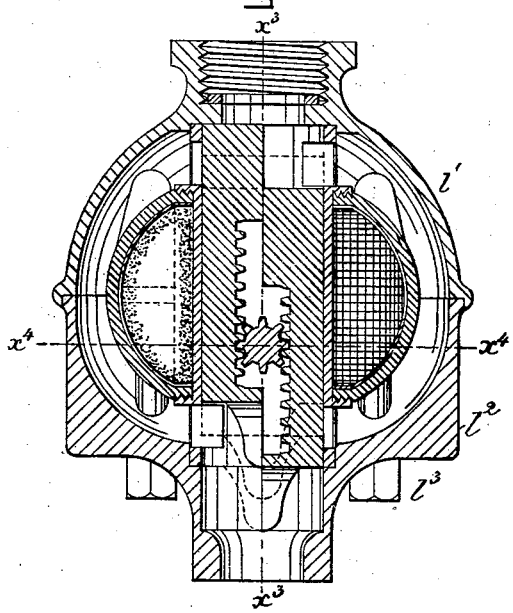
Figure 5:
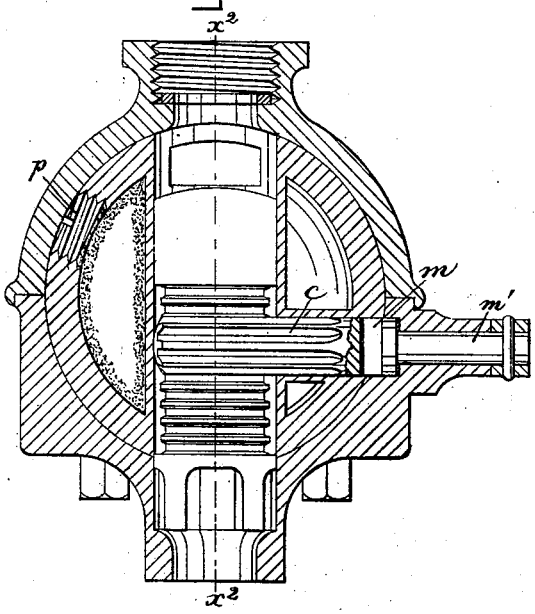
Figure 6:
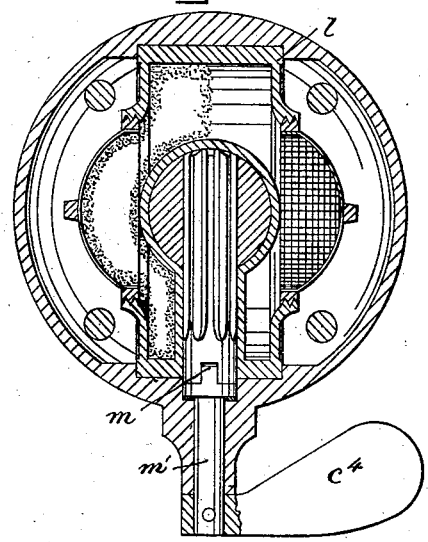

Figure 1 represents, in vertical section, a filter embodying my invention, the said section being taken on the line $x$ $x$, Fig. 2. Fig. 2 is a vertical section on the line $y$ $y$, Fig. 1. Fig. 3 is a central horizontal section on the line $z$, Fig. 2, the shaft for moving the valve being in elevation. Fig. 4 is a vertical central section on the line $x^2$ $x^2$, Fig. 5, of a modification of my invention, wherein the filter is shown in such form as I prefer for small filters. Fig. 5 is a vertical section of Fig. 4 on the line $x^3$ $x^3$, the valve-moving shaft being, however, shown in elevation. Fig. 6 is a central cross-section on the line $x^4$ $x^4$, Fig. 4, the shaft being shown in elevation.

The filter-case $a$, especially for a large filter, has the shape of a short cylinder with flanges 2 at each end, the said cylinder having projecting therefrom inlet and outlet necks 3 4, which, in practice, will be suitably flanged or screw-threaded, to be joined in any usual manner with pipes. This case is made hollow, for the reception of charcoal, gravel, or any other usual filtering medium, some of which is shown at $b$ in Fig. 1. The filter-case is provided with a central valve-passage, in continuation of the inlet and outlet necks 3 4, the said valve-passage being formed, as represented in Fig. 3, by an independent tube, $a^2$; but it is obvious that this valve-passage may be formed by casting, a core being used, or the valve-passage of the shell may be formed by continuing the inner ends of the cast necks 3 4 (shown in Fig. 2) so as to meet. The said case is also provided with a passage or opening for the reception of the shaft $c$, the said shaft-passage being at right angles to the valve-passage, in continuation of the inlet or outlet necks, the shaft-passage, as shown in Figs. 1 to 3, being within a pipe, $c^2$, extended from the outer portion of the shell through the valve-passage. This shaft-passage might be cast as a right-angled tubular extension of the valve-passage. These valve and shaft passages will preferably be formed inside brass or composition pipes to avoid corrosion.

The valve is composed of two parts, $d$ $d'$, preferably cast hollow to make them light and reduce cost, as the said parts will preferably be made of brass or composition metal. These parts $d$ $d'$, at their centers, will have rack-teeth $d^2$, (see Figs. 1 and 2,) to be engaged by the teeth or gear-like end $c^3$ of the valve-moving shaft $c$, the said teeth and shaft being so located that the shaft, when partially rotated by its handle $c^4$, will move the said valves for an equal distance in opposite directions. Fig. 4, by the aid of dotted and full lines, shows these valve parts in the two extreme positions which they will occupy when water is to be passed through the filter-case, and in the third position as when the water flows about but not through the filter-case.

The case $a$ has a central opening, 5, which at each flat side of the case is covered by a reticulated cap, $e$, or strainer, preferably made as a zone of wire-cloth, suitably supported externally and internally by bridges or spiders $f f$, which spiders are joined with the sides of the case by means of bolts or screws $e'$; but, instead of employing such screws, the said spiders and reticulated cap may be secured in place in any other usual manner.

Instead of wire-cloth for the strainer, I might use any ordinary straining material.

The flanged parts 2 of the filter-case serve as seats for the zone-shaped bonnets $g$ $g$, attached thereto by "through-bolts" $g^2$, (see Fig. 3,) or by any other suitable bolts or screws.

The filter-case $a$ has four ports, $h$ $h'$ $h^2$ $h^3$, the ports $h$ and $h^3$ being made in one side of the case, while the ports $h^2$ $h'$ are made in its other side, the pairs of ports $h$ $h'$ and $h^2$ $h^3$ co-operating together, the ports $h$ and $h^2$ to receive water to pass either through or about the filter-case, while the ports $h'$ and $h^3$ permit the discharge of water into the outlet-neck 4.

In the position Figs. 1 to 3 the valve part $d$ is depressed to open the inlet $h^2$ and close the outlet $h'$, while the valve part $d$ is elevated to close the inlet $h$ and open the outlet $h^3$, and in such position the water will follow the course of the arrows, Fig. 1, through the reticulated zones and filtering medium in the case $a$.

In the condition Figs. 1 to 3 the handle $c^4$, connected with the valve-shaft $c$, will stand substantially in horizontal position, and will point in that direction from which the water comes into the filter-case. Reversing the handle $c^4$ will turn the shaft $c$, lift the valve part $d'$ and lower the valve part $d$ to open the inlet $h$, close inlet $h^2$ and open outlet $h'$ and close outlet $h^3$, after which the water will flow through the case $a$ and filtering medium therein in the direction opposite the arrows referred to. If the handle is left in vertical position, both valves will be so placed in position intermediate those shown in Fig. 1, partially uncovering both inlet and outlet ports, permitting the water to pass freely through the apparatus without running through the filtering medium or case.

Making the case $a$ as described, and providing it with flat faces to receive the bonnets, enables me to very materially cheapen the construction of the apparatus, especially when the apparatus is to be of large size.

The construction so far described enables me to dispense with brass or composition for all the parts except the valve, valve-shaft, and the interiors of the passages in which they work or move.

In the drawings, as so far described, I have shown the valves shaped externally to fit a cylindrical valve-passage; but it is obvious that the cross-section of the valve and valve-passage may be rectangular, or of other suitable shape.

In Figs. 1 to 3 the toothed end of shaft $c$ is shown as a pinion; but instead of that construction and the series of teeth $d^2$ on the valve parts, I may use two or more short arms or projections on the said shaft, the said arms being fitted to suitable recesses made in the valve parts.

Figs. 4 to 6, inclusive, show my filter embodied in small size. In this modification the filter-case $l$ is shown as removably fitted into a two-part shell, $l'$ $l^2$, united by suitable bolts, $l^3$, the shell being provided internally with a broad annular groove or seat, to receive the annular periphery of the case $l$ and form a water-tight joint. In order that this filter-case $l$ may be readily applied to or removed from the shell $l'$ $l^2$ without removing the shaft $c$, I have provided the said shaft at one end with a notch to receive a lug, $m$, at the end of a short crank-shaft, $m'$, upon which the handle $c^4$ is placed, rather than directly upon the end of the shaft $c$, as in Figs. 1 to 3.

It will be noticed in the construction herein shown that the case containing the filtering medium never rotates, but always remains fixed with relation to the shell, notwithstanding a change of direction of the water through it, such change being produced by simply partially rotating the valve-shaft and sliding the valve part.

The filter-case $a$, Fig. 5, is provided with a reversible plug, $p$, to permit the introduction of filtering material into the case, or its removal therefrom.

I claim—

1. In a filter, a case containing a valve-passage provided with two inlet and two outlet ports, combined with an oppositely-movable valve composed of two oppositely-moving parts, to open and close the said ports, substantially as and for the purpose described.

2. In a filter, a valve-case containing a valve-passage provided with two inlet and two outlet ports, and with reticulated caps at each side the valve-case, combined with a valve composed of two independent parts, and with a shaft to move the said valves, substantially as and for the purpose described.

3. In a filter, the flat-sided hollow filter-case provided with the valve and valve-shaft passages, and inlet and outlet neck, combined with the bonnets connected directly with the sides of the filtering-case, and with reticulated caps or strainers to cover the central portions of the sides of the said case, substantially as described.

4. The filter-case provided with the valve-passage, combined with the two parts $d$ $d'$ of the valve, and with the valve-moving shaft, and means to connect the said shaft with both the said valves, whereby movement of the said shaft in one direction simultaneously operates the parts $d$ $d'$ of the valve in opposite directions, substantially as described.

In testimony whereof I have signed my name to this specification in the presence of two subscribing witnesses.

CHARLES CARR.

Witnesses:
G. W. GREGORY,
B. J. NOYES.